La Cortes Tanney,
Cheese Press.
N°45,444.  Patented Dec. 13, 1864.
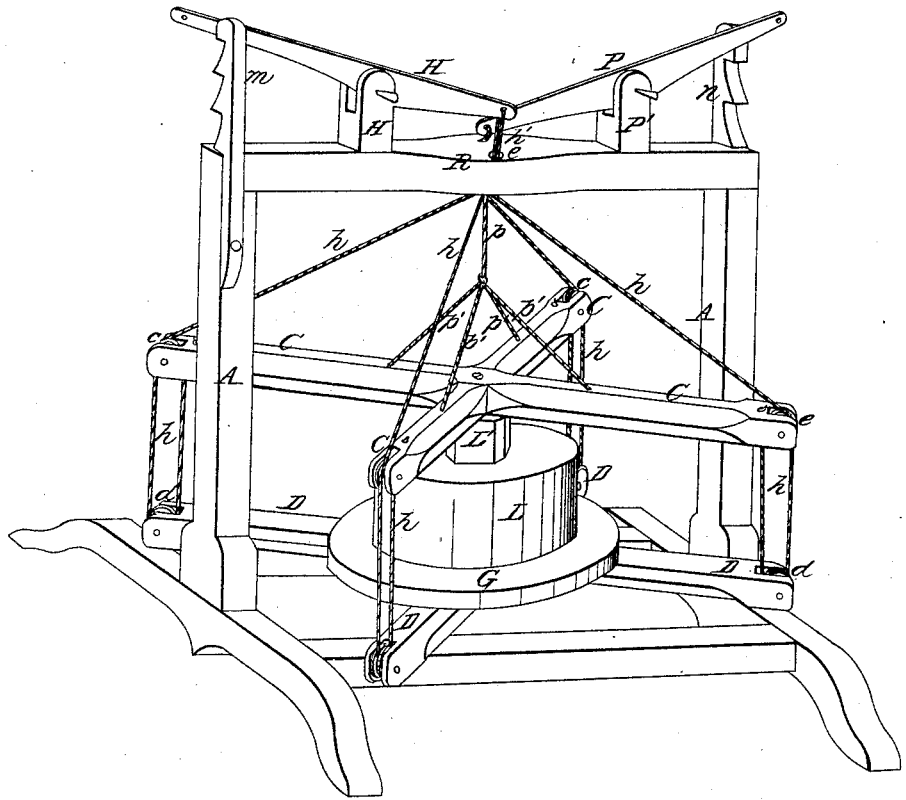
Witnesses:
J. Leonard
A. W. McClelland
Inventor:
La Cortes Tanney

UNITED STATES PATENT OFFICE.

LA CORTES TANNEY, OF OLMSTEAD, OHIO.

IMPROVED CHEESE-PRESS.

Specification forming part of Letters Patent No. 45,444, dated December 13, 1864.

*To all whom it may concern:*

Be it known that I, LA CORTES TANNEY, of Olmstead, in the icounty of Cuyahoga and State of Ohio, have invented certain new and useful Improvements in Cheese-Presses; and I do hereby declare that the following is a full and complete description of the construction and operation of the same, reference being had to the accompanying drawings, making a part of this specification, in which—

Figure 1 is a perspective view of the press.

My improvement relates to constructing a machine for pressing cheese that is self-pressing or automatic in its operation, and any degree of pressure can be produced upon the cheese without moving or handling it in any way.

The frame of the machine consists of standards or end pieces, A A, firmly secured at the lower ends to suitable frame-work, as represented, with a piece, B, across the top. The press is suspended underneath the cross-bar B, and consists of four arms, C, formed by two pieces crossing each other diagonally above the cheese, and four arms, D, below, made in a similar manner. In the end of each of these arms is a sheave or pulley, as seen at *c* and *d*, and to the upper cross-arms, just inside of the pulleys *c*, are attached the cords or ropes *h*, that extend down underneath the pulleys *d* in the lower arms up over the pulleys *c;* thus connecting the upper and under arms, and the cords are all brought together in the center, and connect through an opening, *e*, in the cross-bar to the end of a lever, H, by a cord, *h'*, as represented. The lever H is pivoted to a standard, H', on the cross-bar, where it has its fulcrum; and *m* is a rack secured to the frame that the outer end of the lever can be adjusted under, retaining it in any position necessary to produce the required pressure on the cheese.

P is another lever pivoted to the standard P', to the inner end of which is attached a cord, *p*, that extends down through a hole in the cross-bar, and is connected to the cords *p'*, secured to the upper arms midway between the center and outside ends, as represented. By means of this lever the upper arms can be elevated, decreasing the pressure on the cheese, and it can be retained in any desired position by the rack *n*.

G is a table or platform for the cheese, secured to the arms D. L represents the cheese, and the upper arms are fastened to a block, L', above the cheese.

In operating this machine, the cheese being placed upon the table, and by lowering the outer end of the lever H (adjusting it accordingly in the rack) the cords *h* are drawn up, which brings the arms C and D nearer together my means of the cords and pulleys, as described. As the weight of the cheese is suspended on the cords and pulleys between the arms, it follows that the cheese is pressed by its own weight, or the press is automatic in its operation, and the heavier the cheese the tighter the cords would be drawn and the greater the pressure, the pressure would always be in proportion to the weight of the cheese. But this pressure can be adjusted and relieved when it is too great by means of the lever P, which, by lowering the outer end, raises the upper arms C, diminishing the pressure on the cheese, or removing it entirely when required. Thus by means of the levers any desired amount of pressure can be produced upon the cheese without handling it in any way.

What I claim as my improvement, and desire to secure by Letters Patent, is—

The arrangement of the arms C and D, sheaves *c* and *d*, in combination with cords *h*, *p*, and *p'*, and levers H and P, when operating conjointly, as and for the purpose set forth.

LA CORTES TANNEY.

Witnesses:
J. LEONARD,
A. W. MCCLELLAND.